W. R. THATCHER.
MILK PASTEURIZER AND SEPARATOR.
APPLICATION FILED JUNE 19, 1908.
916,221.
Patented Mar. 23, 1909.
2 SHEETS—SHEET 1.
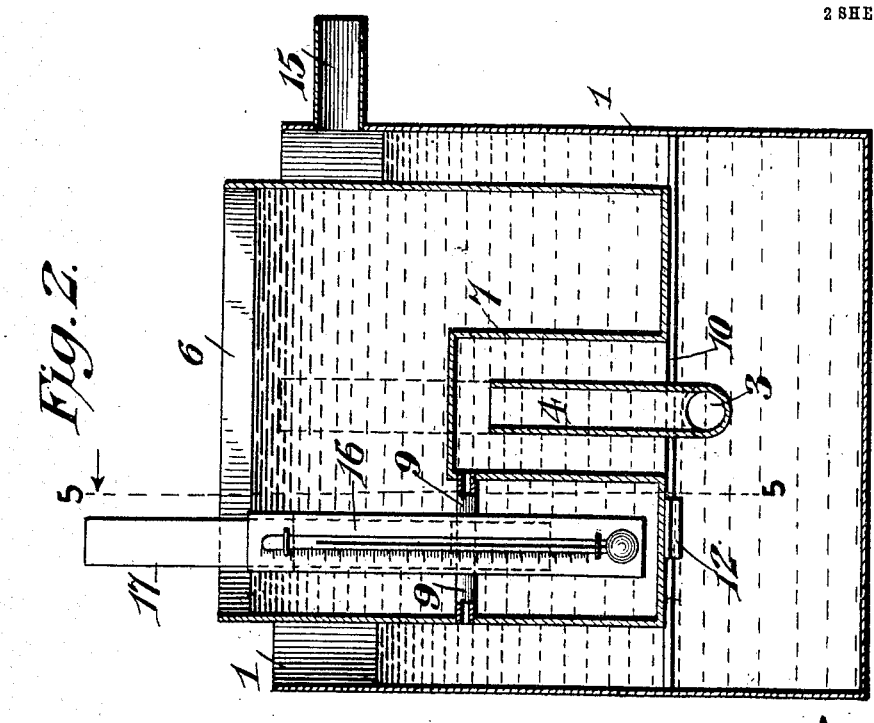
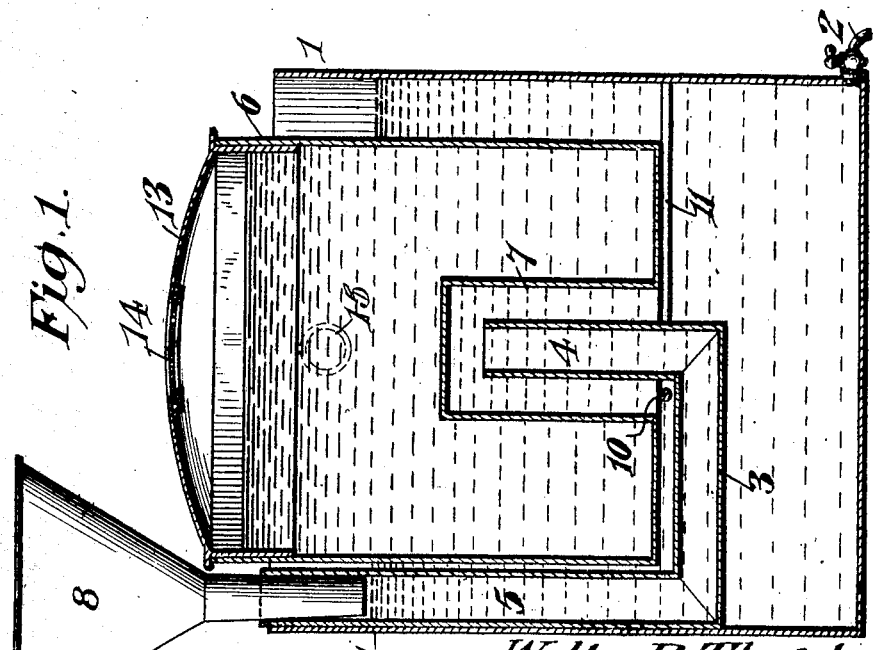
Witnesses
Jas. V. McCathran
H. F. Riley
Walter R. Thatcher, Inventor
By C. G. Siggers
Attorney

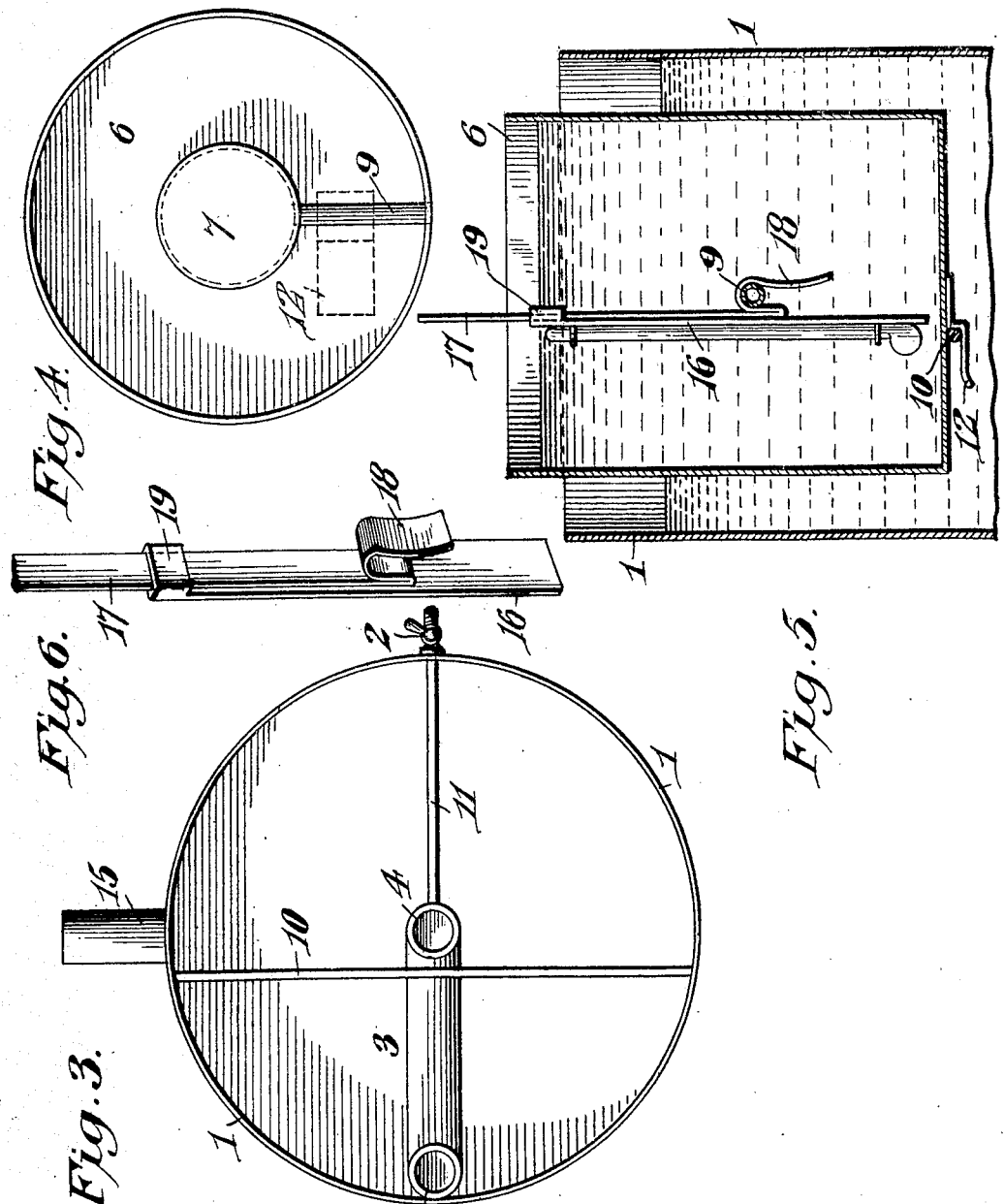

UNITED STATES PATENT OFFICE.

WALTER R. THATCHER, OF OSKALOOSA, IOWA.

MILK PASTEURIZER AND SEPARATOR.

No. 916,221.  Specification of Letters Patent.  Patented March 23, 1909.

Application filed June 19, 1908. Serial No. 439,354.

*To all whom it may concern:*

Be it known that I, WALTER R. THATCHER, a citizen of the United States, residing at Oskaloosa, in the county of Mahaska and State of Iowa, have invented a new and useful Milk Pasteurizer and Separator, of which the following is a specification.

The invention relates to a milk pasteurizer and separator.

The object of the present invention is to provide a simple, inexpensive and efficient milk pasteurizer and cream separator, adapted to enable milk to be subjected to the action of hot and cold water successively for first pasteurizing the milk and then separating the cream, and capable of enabling the temperature of the milk to be rapidly changed, so that the pasteurizing and cream separating operations may be quickly performed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a vertical sectional view of a milk pasteurizer and cream separator, constructed in accordance with this invention. Fig. 2 is a vertical sectional view of the same, the cover being removed and the thermometer being applied to the milk receptacle. Fig. 3 is a plan view of the outer receptacle. Fig. 4 is a similar view of the inner receptacle. Fig. 5 is a vertical sectional view, taken substantially on the line 5—5 of Fig. 2. Fig. 6 is a detail perspective view, illustrating the construction of the means for detachably securing the removable thermometer in position within the inner receptacle.

Like numerals of reference designate corresponding parts in all the figures of the drawings.

1 designates an outer water receptacle, preferably of cylindrical form and provided at the bottom with a cock or faucet 2 for drawing off the water and having an approximately U-shaped filling tube 3, consisting of inner and outer vertical sides 4 and 5 and a connecting bottom portion. The outer side, which is longer than the inner side 4, is secured to the inner face of one side of the outer receptacle and it extends from the top thereof to the lower portion of the same, the bottom of the filling tube being spaced from the bottom of the outer receptacle. The inner side 4 of the filling tube is centrally arranged and is adapted to deliver the water at the center of the body of milk contained within the inner receptacle 6, provided with a central cylindrical shell 7 closed at the top and open at the bottom to communicate with the outer receptacle. The inner receptacle is arranged in spaced relation with the outer receptacle, and the outer vertical side or portion of the filling tube is located in the space between the inner and outer receptacles. The lower end of the inner shell is suitably secured to the bottom of the inner receptacle, which is provided with a central circular opening. The water is preferably supplied to the filling tube by means of a funnel 8, and as it is discharged from the upper end of the inner side 4, it flows downward around the bottom of the inner receptacle and up the sides. The inner receptacle is equipped with a horizontal air or vent tube 9, located near the top of the inner shell and extended over the same at one end of the inner receptacle and piercing such side and the said shell. The air tube permits the air to escape from the inner shell as the water rises therein, so that the inner shell will be completely filled with water, whereby the contents of the inner receptacle will be thoroughly subjected to the action of the water both in raising and lowering the temperature of the milk. The inner receptacle is supported upon horizontal rods 10 and 11, which hold the inner receptacle above the bottom of the outer receptacle. The rod 10 extends entirely across the outer receptacle, and the other rod 11 extends from the inner side of the filling tube to one side of the outer receptacle. The inner receptacle is equipped at the bottom with a catch 12, which is interlocked with one of the supporting rods by partially rotating the inner receptacle, whereby the said inner receptacle is secured to the support and is prevented from floating in the outer receptacle. The catch consists of a piece of sheet metal, or other suitable material, secured at one end to the lower face of the inner receptacle and bent at an intermediate point to off-set its engaging portion from the lower face of the bottom of the inner receptacle to provide a space for the engaging supporting rods.

The inner receptacle is equipped with a cover 13, provided with a substantially concavo-convex top and having a central strainer 14, adapted to permit the escape of the gases from the milk, and operating to exclude flies and other insects from the inner receptacle, and adapted to permit the cover also to be employed for straining the milk. The inner receptacle extends above the outer receptacle, and the cover is preferably provided with a flange fitting within the inner receptacle.

The outer receptacle is equipped with an over-flow pipe 15, and after the milk has been placed in the inner receptacle, hot water is poured into the outer receptacle through the funnel and the filling tube until the temperature of the contents of the inner receptacle is raised to a temperature necessary to pasteurize the milk. As the hot water is delivered to the outer receptacle at a point adjacent to the center of the body of milk, it effectively operates to rapidly change and raise the temperature of the contents of the inner receptacle. The hot water is allowed to stand within the outer receptacle until the contents of the inner receptacle are thoroughly pasteurized, and the water is then drawn off through the cock or faucet 2. The milk is then subjected to the action of the cold water, which is supplied to the inner receptacle in the same manner as the hot water, and the manner of delivering the cold water to the apparatus is equally effective in lowering the temperature of the milk as in raising the temperature of the same. The cold water is supplied until the milk is lowered to the temperature necessary to effect a separation of the cream.

The temperature of the contents of the inner receptacle is ascertained by means of a removable thermometer 16, mounted on a vertical stem or support 17, which is provided at its lower end with a clamp 18 for engaging the horizontal air tube of the inner receptacle. The thermometer is provided at the top with an approximately rectangular loop 19, which receives and slides on the vertical stem or support 17. The vertical stem or support 17, which is preferably constructed of metal, has its lower end bent backward or upward on itself to provide one side or jaw of the clamp, and the other side or jaw is formed by bending the metal outward and downward, as shown. The clamp, which is resilient, is approximately inverted U-shaped, and it is adapted to be readily engaged with and disengaged from the air tube. The slidable connection between the thermometer and the vertical stem or support enables the thermometer to be raised and lowered to arrange it in proper position to suit the quantity of milk within the inner receptacle.

Having thus fully described my invention, what I claim as new and desire to secure by Letters Patent, is:—

1. An apparatus of the class described including an outer water receptacle, an inner milk receptacle arranged in spaced relation with the outer water receptacle and provided with a shell extending upwardly from the bottom of the inner receptacle and closed at the top and open at the bottom and in communication with the outer receptacle, and a filling tube composed of inner and outer vertical portions of different lengths, and a connecting portion, the outer portion being arranged and supported in the space between the receptacles and extending to the top of the outer receptacle in position to receive a funnel, and the inner portion being shorter than the outer portion and extending upward into the shell of the inner receptacle.

2. An apparatus of the class described including an outer water receptacle, a substantially U-shaped filling tube composed of inner and outer vertical upwardly extending sides, and a connecting bottom portion, the inner side being arranged centrally of the outer receptacle and the outer side being secured to the inner face of one side of the outer receptacle and extending to the top thereof, supporting rods arranged within the outer receptacle, and an inner milk receptacle mounted on the supporting rods in spaced relation with the outer receptacle and provided with an inner shell closed at the top and having an open lower end communicating with the outer receptacle, said shell being arranged over and receiving the inner side of the filling tube, the outer side of the filling tube being located within the space between the inner and outer receptacles.

3. An apparatus of the class described including an outer water receptacle, a substantially U-shaped filling tube composed of inner and outer vertical upwardly extending sides, and a connecting bottom portion, the inner side being arranged centrally of the outer receptacle and the outer side being secured to the inner face of one side of the outer receptacle and extending to the top thereof, supporting rods arranged within the outer receptacle, an inner milk receptacle arranged in spaced relation with the outer receptacle and provided with an inner shell closed at the top and open at the bottom to receive the inner side of the filling tube, the outer side being located in the space between the inner and outer receptacles, and a catch arranged at the bottom of and carried by the inner receptacle and detachably engaging one of the supporting rods.

4. An apparatus of the class described including an outer water receptacle provided with an over-flow tube, an approximately U-shaped filling tube having a centrally arranged discharging portion and secured to the inner face of one side of the outer receptacle, horizontal supporting rods arranged within the outer receptacle, one of the rods being connected with the centrally arranged portion of the filling tube, an inner milk receptacle arranged on the supporting rods in spaced relation with the outer receptacle and provided with a central shell open at the bottom to receive the centrally arranged portion of the filling tube, the outer portion of the filling tube being located in the space between the inner and outer receptacles, and a cover for the inner receptacle.

5. An apparatus of the class described including an outer receptacle, a filling tube having an inner upwardly extending portion, a horizontal supporting rod, an inner receptacle arranged upon the supporting rod and provided with an inner shell closed at the top and open at the bottom to receive the upwardly extending portion of the filling tube, and a catch carried by the inner receptacle and arranged at the bottom thereof and detachably engaging the supporting rod.

In testimony, that I claim the foregoing as my own, I have hereto affixed my signature in the presence of two witnesses.

WALTER R. THATCHER.

Witnesses:
TERRELL C. STEDDOM,
WILLIAM CARR.